United States Patent [19]
Chiang et al.

[11] Patent Number: 5,782,079
[45] Date of Patent: Jul. 21, 1998

[54] MINIATURE LIQUID-FUELED TURBOJET ENGINE

[75] Inventors: Hsiao-Wei D. Chiang; Wu-Chi Ho, both of Hsinchu; Ling-Chia Weng, ChiaYi; Ming-Yen Liu, YunLin; Tzeng-Wuu Wey, Hsinchu; Chii-Ron Kuo, Taoyuan, all of Taiwan

[73] Assignee: Industrial Technology Research Institute, Hsinchu, Taiwan

[21] Appl. No.: 810,121

[22] Filed: Feb. 25, 1997

[51] Int. Cl.$^6$ .................. F02C 3/08; F23R 3/16
[52] U.S. Cl. .................. 60/39.36; 60/39.75; 60/249
[58] Field of Search .................. 60/39.36, 39.75, 60/269, 734, 740, 743, 749

[56] References Cited

U.S. PATENT DOCUMENTS 2,477,683  8/1949  Birmann ............... 60/39.36
2,593,523  4/1952  Bauger ................. 60/39.75
3,302,399  2/1967  Tini et al. ............. 60/749
5,203,796  4/1993  Washam et al. ....... 60/749
5,341,645  8/1994  Ansart et al. ......... 60/749

*Primary Examiner*—Louis J. Casaregola
*Attorney, Agent, or Firm*—W. Wayne Liauh

[57] ABSTRACT

A miniture liquid-fueled turbojet engine for powering remote control model aeroplane or light pilotless aircraft includes a plural number of tiny pressure-swirl type atomizers for thoroughly atomizing liquid fuel and a V-gutter flame holder. High combustion efficiency and satisfactory outlet temperature pattern factor can be obtained in the present combustion system of the engine. This is because the system possesses the characteristics such as fine spray of liquid fuel, long residence time of fuel droplets, efficient flame holding mechanism and good mixing in the dilution region. As a result, safety and maneuverability of the present engine can be enhanced in comparison with the engines of prior art.

6 Claims, 7 Drawing Sheets

| Engine | JPX T-240 | FD 3/64 | J450 | the present invention |
|---|---|---|---|---|
| Country | French | German | Japan | Taiwan (R.O.C.) |
| Size (mm) | 116 (diameter) 335 (longitude) | 110 (diameter) 265 (longitude) | 116 (diameter) 335 (longitude) | 116 (diameter) 305 (longitude) |
| Fuel | Gaseous Propane ($C_3H_8$) | Mixture of gasoline and Kerosene | liquid JP oil | Mixture of gasoline and Kerosene |
| Thrust Power | 45 N | 30 N | 56 N | 56 N |
| SFC | 176 g/N/hr | 324 g/N/hr | 145 g/N/hr | 135 g/N/hr |
| EGT | 680°C | above 700°C | above 700°C | under 710°C |

FIG. 7

MINIATURE LIQUID-FUELED TURBOJET ENGINE

BACKGROUND OF THE INVENTION

1. Field of the Invention

This invention relates to a miniature liquid-fueled turbojet engine for powering a remote-controlled model airplane or a light pilotless aircraft.

2. Description of the Prior Art

Conventional remote-controlled model aeroplanes or light pilotless aircrafts usually use reciprocal engines. The reciprocal engine has a number of drawbacks, notably the high noise level and difficult operation (duct fan). There have been some turbojet engines being developed trying to overcome those disadvantages. However they also have their share of deficiencies which in turn limit their applicability. These deficiencies include flame-out, safety concern and starting. The following offers more elaboration of the prior arts as a comparison with the improvements of this invention.

FIG. 1 shows a French made JPX T-240 turbo-jet engine 10. It includes mainly a compressor 11, a gaseous fuel pipe 12, a gaseous fuel inlet 13, a cold section bearing 14, a shaft 15, a combustion zone 16, a hot section bearing 17, turbine guide vanes 18 and jet tube 19. It uses propane ($C_3H_8$) fuel. It is highly volatile and has high risk concerns in handling and use. Modellers, who are accustomed to handle liquid fuel, have severe concern on its use.

FIG. 2 illustrates a Germany made FD3/64 engine 20. It includes mainly a compressor 21, a fuel pipe 22, a combustion chamber inner liner 23, a combustion outer liner 24, a fuel return pipe 25, a combustion zone 26, a hot section bearing 27, a fuel vaporizer 28 and an axial turbine 29. It has the disadvantages of under-power, flame out, hazardous ignition and not reliable rotation parts.

FIG. 3 shows a Japanese made J450 engine 30, which is slightly modified using JPX engine for accommodating the use of liquid fuel. It includes mainly a compressor 31, a fuel pipe 32, an air inlet 33, a cold section bearing 34, a shaft 35, a combustion zone 36, a hot section bearing 37, turbine guide vanes 38, jet tube 39, starting air inlet 40, lubricant inlet 41, atomizer 42, cylindrical wire 43, a turbine 44 and an exhaust tail pipe 45. It has the shortcomings of difficult start-up, creating overheating zone in the turbine section and resulting in shortening of engine service life, difficult for atomizer installation and high specific fuel consumption rate.

All the prior liquid-fueled engines set forth above have the common problems of fuel not being fully atomized, inefficient frame-holding mechanism and thus incomplete combustion. JPX T-240 engine 10 (FIG. 1) is originally designed to use gaseous fuel so that it cannot use liquid fuel such as gasoline or kerosene which is easier to handle for modellers. The pressurized propane is a highly risky fuel and has severe safety concern although using such fuel can avoid atomization problem. FD3/64 engine 20 (FIG. 2), although it has a fuel evaporizer 28 for fuel preheat and injection purposes, it does not have efficient flame holding mechanism and atomization device in the combustion zone 26 to attain complete combustion. Thus chemical reaction of combustible mixture discharged from combustor may remain continuous in the downstream hot section stage so that flameout phenomenon is resulted. The turbine rotor consequently has shorter service life under such a high temperature environment. J450 engine 30 (FIG. 3) has atomizers 42 and cylindrical wire 43. However the cylindrical wire 43 cannot effectively generate a recirculation zone for flame holding purpose in the primary zone 36, therefore heat source is dispersed away during the engine initial starting stage that makes engine initial starting difficult. The engine is also prone to overheating and thus reducing service life of the engine.

SUMMARY OF THE INVENTION

In view of the disadvantages mentioned above, it is therefore an object of this invention to provide a miniature liquid-fueled turbojet engine including a sophisticated combustion system which can eliminate the drawbacks of the prior arts. To achieve this goal, not only complete combustion but acceptable temperature pattern factor is required throughout the whole operation range. As a result, proper fuel atomization and distribution, flame holding mechanism and airflow distribution are required in the design of the combustion system. Six tiny pressure-swirl atomizers are placed in the front end of chamber support to give fine droplets and distribute fuel in circumferential direction. Since the fuel is injected radially, the residence time of fuel droplets can be significantly increased as compared to axial injection. To confine the flame inside the combustion chamber, a V-gutter flame holding concept is employed here. Flame holders in the present system not only provides the recirculation zones but also generate a primary zone with high combustion intensity. The air inlets on the combustor wall is designed to meet the following requirements: a suitable operation range of the primary-zone equivalence ratio, a proper film-cooling flows to protect the wall without quenching the flame in the intermediate zone, an efficient mixing in the dilution zone, etc.

BRIEF DESCRIPTION OF THE DRAWINGS

The invention, as well as its many advantages, may be further understood by the following detailed description and drawings in which:

FIG. 7 is the test comparison of this invention with the prior arts.

DETAILED DESCRIPTION OF THE PREFERRED EMBODIMENT

Figure 1:
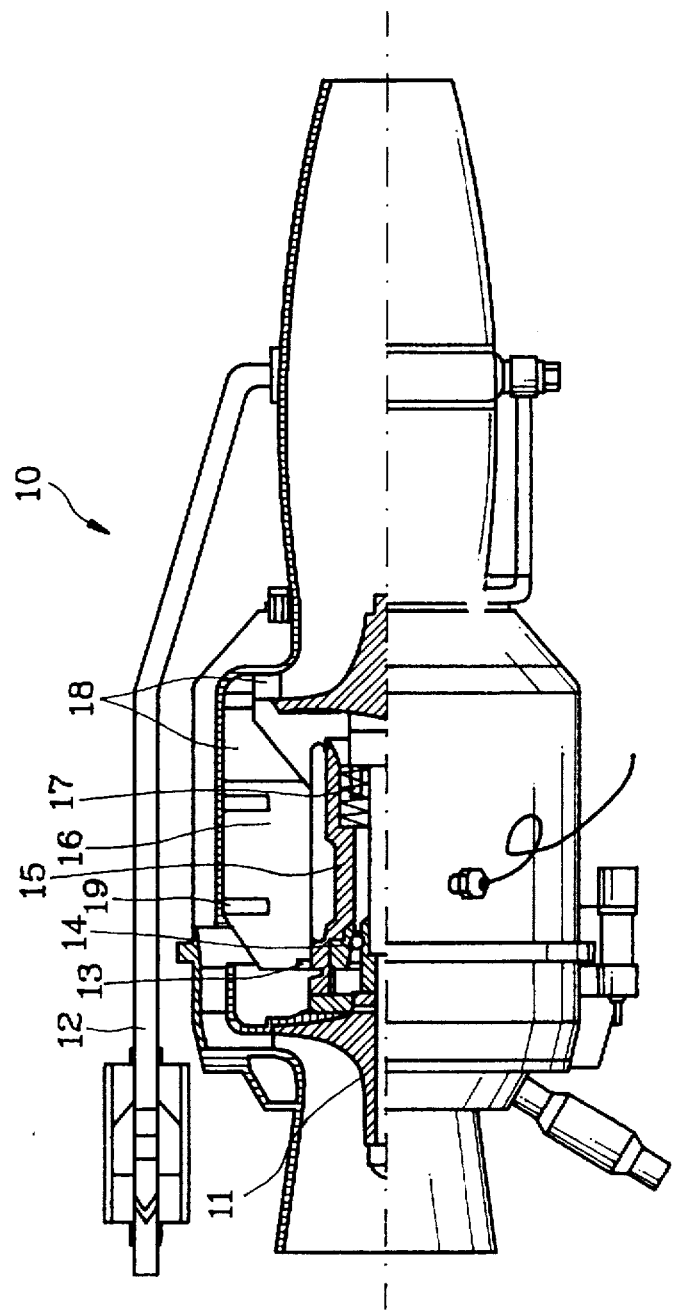
FIG. 1 is a sectional side view of a French made JPX T-240 turbo-jet engine.
Figure 2:
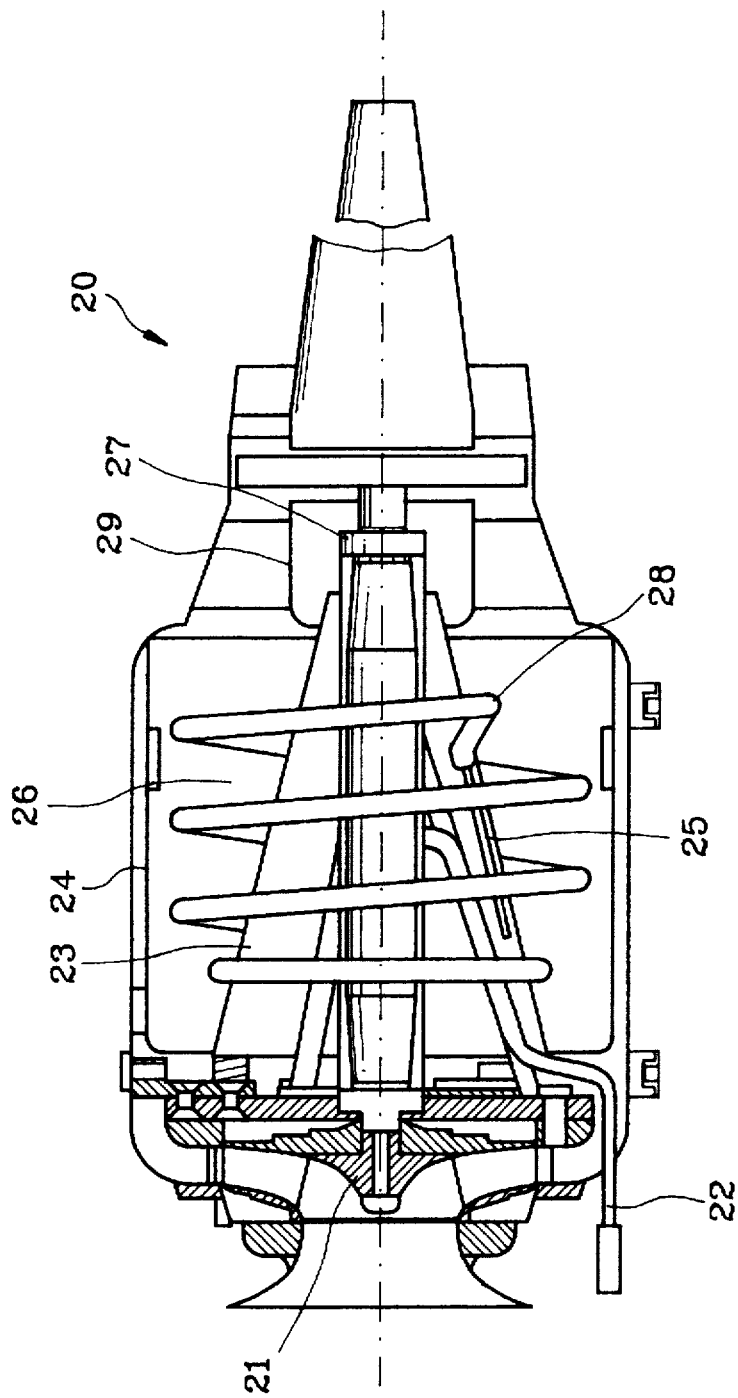
FIG. 2 is a sectional side view of a Germany made FD3/64 turbo-jet engine.
Figure 3:
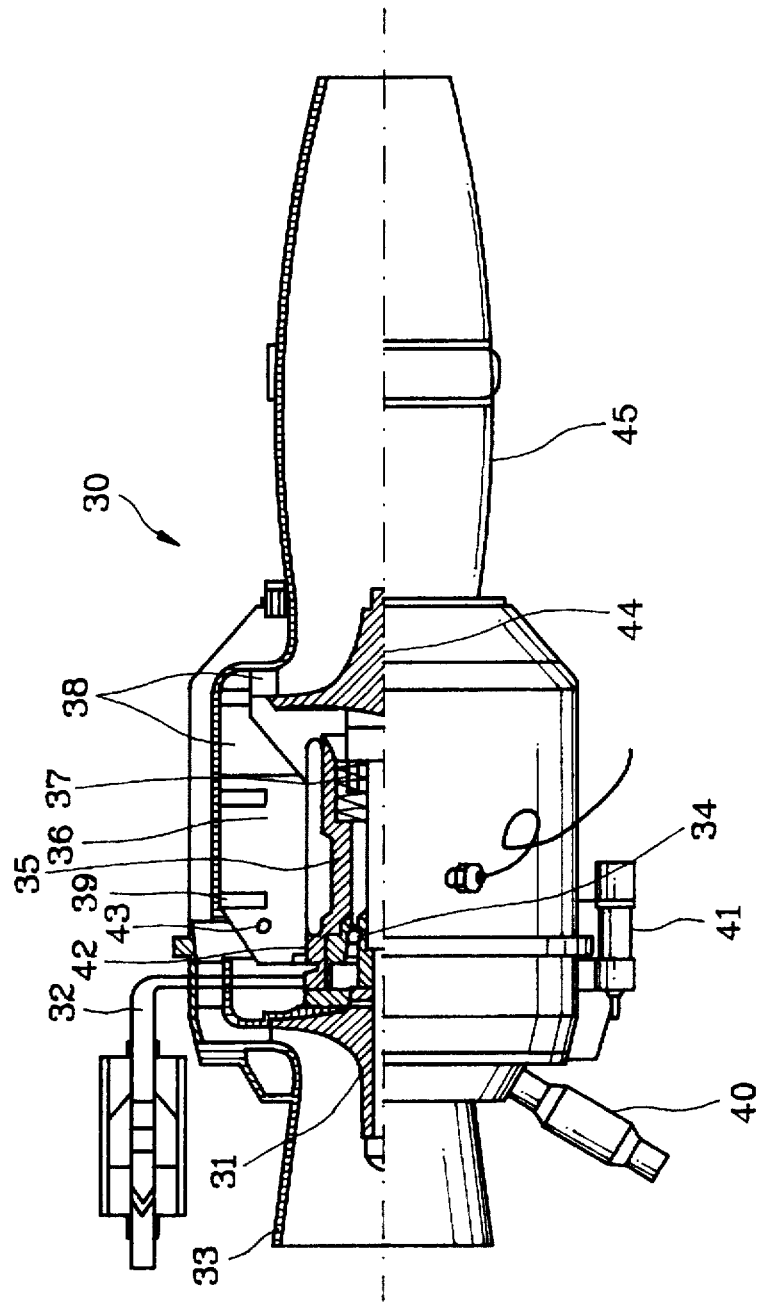
FIG. 3 is a sectional side view of a Japanese made J450 turbo-jet engine.
Figure 4:
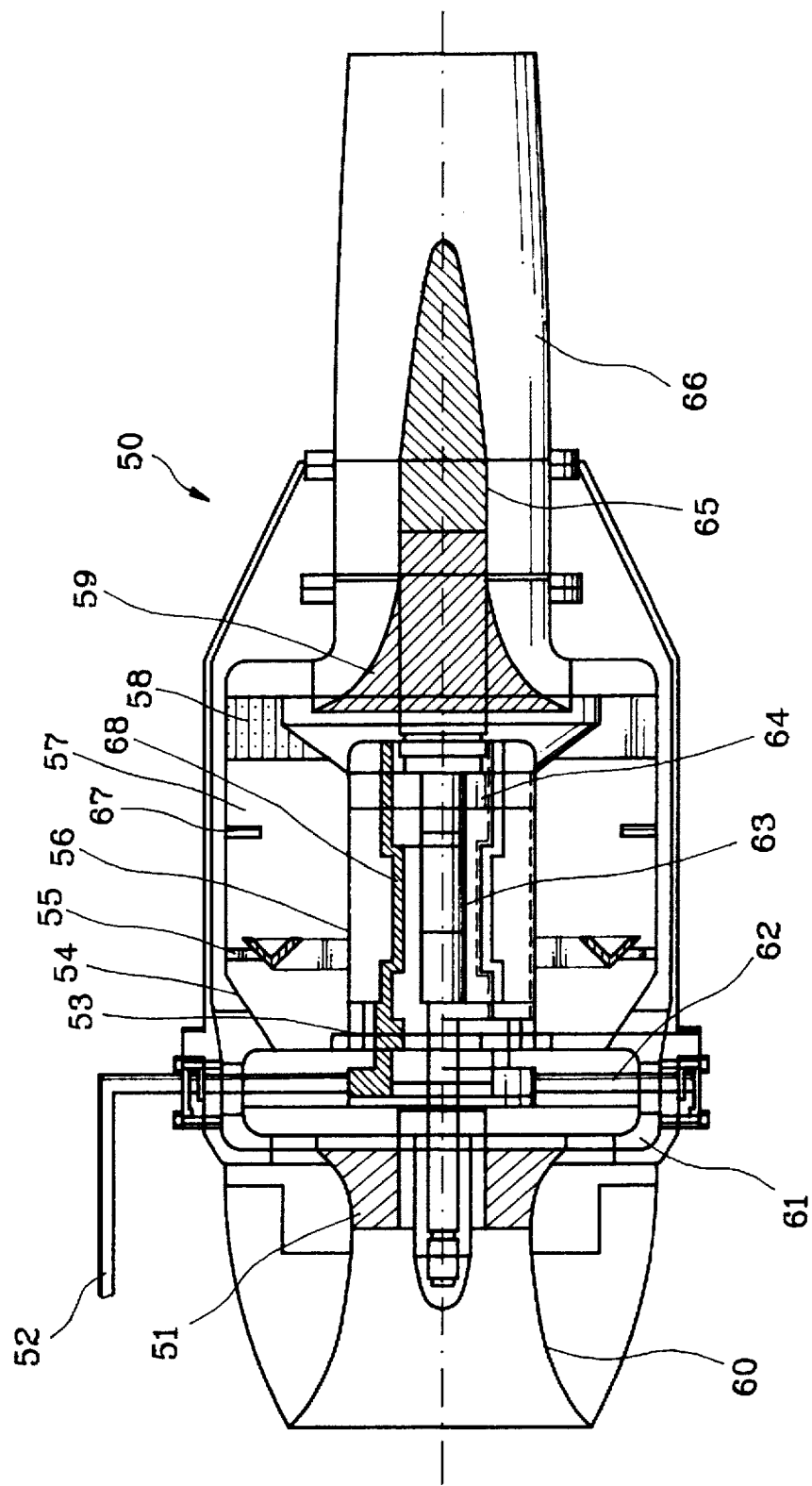
FIG. 4 is a sectional side view of the present invention.

Referring to FIG. 4, the miniature liquid-fueled turbojet engine 50 according to this invention includes mainly a centrifugal compressor 51, a fuel pipe 52, a plural number of atomizers 53, a combustion chamber outer liner 54, an annular-shaped V-gutter flame holder 55, a combustion chamber inner liner 56, an annular combustion chamber 57, turbine blades 58, a radial-inflow turbine 59, a bell mouth inlet 60, diffuser vanes 61, a lubricant pipe 62, a shaft 63, a hot section bearing 64, a central body 65, an exhaust tail pipe 66 and a set of dilution jet tubes 67.

In the combustion chamber inner liner 56 and at the front section of the combustion chamber 57, there are provided with a plural number (preferably six) of tiny pressure-swirl type atomizers 53 equally spaced with each other in circumferential direction around the front end of the chamber support 68.

Figure 5:
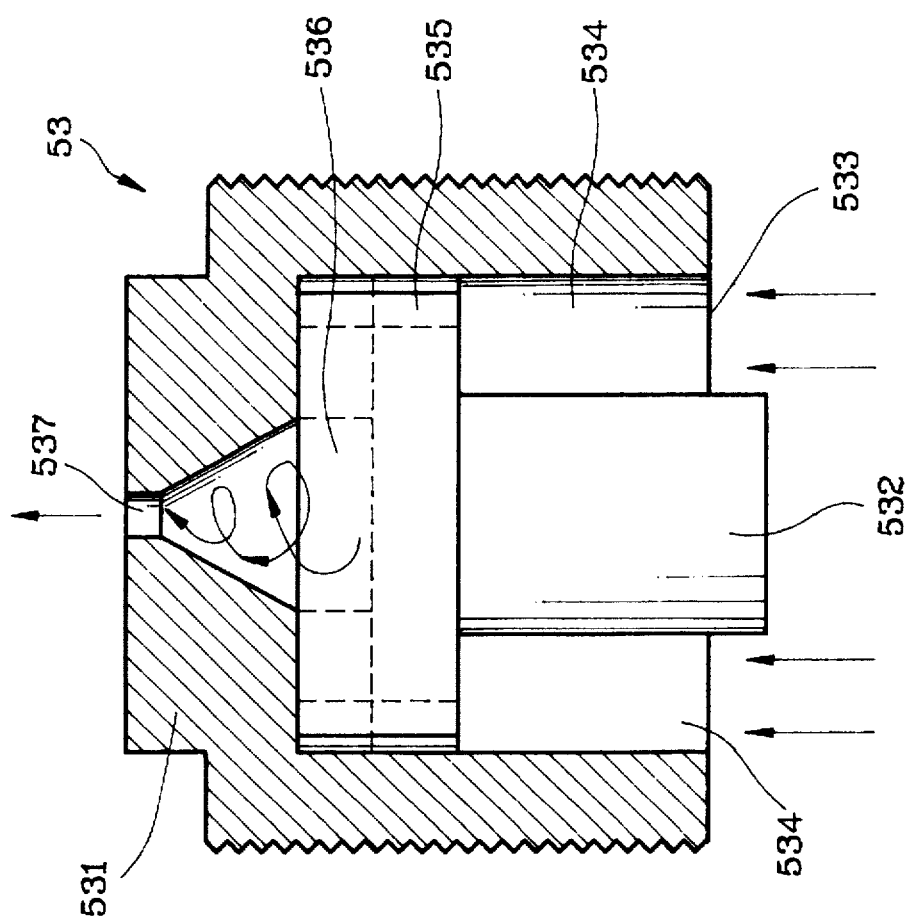
FIG. 5 is a sectional view of an atomizer of this invention.

Referring to FIG. 5, the atomizer 53 is a substantially cylindrical member with an outside diameter about 5 mm consisting of a cap 531 and a plug 532 with an annular space of pressure reservoir 534 formed therebetween. Fuel is introduced into the atomizer 53 through a fuel inlet 533, passing through the pressure reservoir 534 and a fuel passage 535, and entering into a swirling tube 536. Pressurized fuel is highly swirly in the swirling tube 536 and thus can be atomized thoroughly while being ejected out of the atomizer 53 via a orifice 537 into the front section of the combustion chamber 57. The pressure reservoir 534 of the atomizer 53 of this invention is substantial for very good amortization. Experiment results show that it can reach SMD=25μ. The outside surface of the cap 531 is formed in M5 screw threads and thus can be screwed in the combustion chamber support 68 easily and securely (shown in FIG. 4). As fuel is injected into the combustion chamber 57 in radial direction, the atomization effect can be further enhanced due to the interaction with surrounding high speed airflow, besides, the residence time of fuel and gas mixture held in the combustion chamber 57 can also be increased. All of these will facilitate complete combustion. The high speed rotation of the engine rotor usually will create high frequency vibration which might unscrew the atomizer 53 after long time of use. Therefore this invention has the front end of the combustion chamber outer liner 54 firmly held against the atomizer 53 to secure its proper position and to ensure the atomizer 53 can function properly. The atomized fuel mixes with the pressurized air coming out of the compressor 51 for ignition in the combustion chamber 57.

Figure 6:
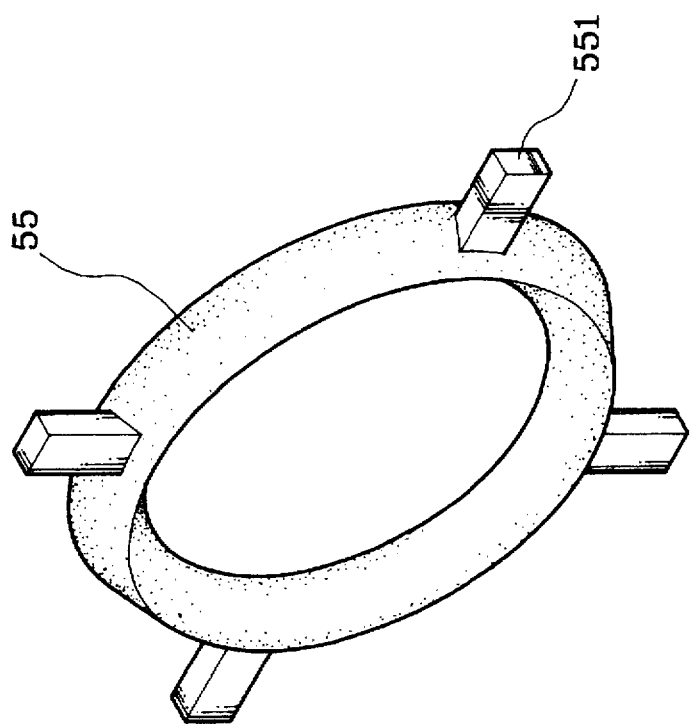
FIG. 6 is a perspective view of a V-gutter flame holder of this invention.

This invention further has an annular V-gutter flame holder 55 disposed in the combustion chamber 57 (as shown in FIGS. 4 and 6). The V-gutter flame holder 55 is fixedly secured to the inside surface of the combustion chamber outer liner 54 via a plural number of struts 551. The presence of the V-gutter flame holder 55 will create a highly turbulent zone in the primary zone and a recirculation zone behind itself. As a result, intensive mixing between fuel droplets and combustion air is created in the primary zone. In accordance with experimental findings, very intensive combustion is observed in the primary zone which is mainly in the front section of the combustion chamber 57. This phenomenon facilitates stable and complete combustion. The cooling air flows into the intermediate region through a plunge slot which can protect the combustion wall and does not quench the flame. Besides, part of cooling airflow will be used for further chemical reaction in this region. Because of the V-gutter flame holder 55, the flame can be stabilized in this region due to the generator of the recirculation zone. Therefore the continuous combustion can be resulted. Owing to the fine spray of liquid fuel, long residence time of fuel droplets, efficient flame holding mechanism and good mixing in the dilution region, cantinuous combustion with high combustion efficiency and fair temperature pattern factor can be achieved. Consequently a stable thrust power will be obtained in the operation range. Since the combustor is immediately ignited after the glow plug (not shown in figures) is energized, only temporary flame-out phenomenon is observed in the starting stage. The engine is accelerated to its idle speed within few seconds. According to the experimental finding in full engine tests, the thrust power produced by the engine is spontaneously responding to the fuel input rate. Therefore, safety and engine performance are enhanced as compared with previous engines of prior arts.

FIG. 7 shows the testing results of this invention comparing with the prior arts previously set forth. In addition to the aforesaid advantages, this invention also has much better specific fuel consumption rate (SFC).

Beside the features mentioned above, the implementation of this invention shall also take into account other structural issues, such as thermal expansion effect when fixing the strut 551 of the V-gutter flame holder 55 to the combustion chamber outer liner 54.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

We claim:

1. A miniature liquid-fueled turbojet engine comprising:

a bell mouth inlet;

a centrifugal compressor;

an annular combustion chamber including an outer liner and an inner liner located behind the compressor, and a plural number of tiny pressure-swirl type atomizers located at the front end thereof for atomizing liquid fuel injected radically into the front section of the combustion chamber;

an annular-shaped V-gutter flame holder located in the combustion chamber and behind the atomizers;

a radial-inflow turbine located behind the combustion chamber;

a shaft running through the compressor, the combustion chamber and the turbine; and an exhaust tail pipe located behind the turbine.

2. A miniature liquid-fueled turbojet engine of claim 1, wherein the atomizer includes a cap and a plug, forming a pressure reservoir therebetween, the cap having a fuel inlet and an orifice, the plug having a fuel passage and a swirling tube; wherein fuel flows from the fuel inlet through the pressure reservoir, the fuel passage and the swirling tube and then ejects into the combustion chamber via the orifice.

3. A miniature liquid-fueled turbojet engine of claim 1, wherein the outside surface of the cap of the atomizer has screw threads formed thereon.

4. A miniature liquid-fueled turbojet engine of claim 1, wherein the atomizers are circumferentially located at the front end of the inner liner of the combustion chamber and being equally spaced with each other.

5. A miniature liquid-fueled turbojet engine of claim 1, wherein the V-gutter flame holder is fixedly attached to the inside surface of the outer liner of the combustion chamber by means of a plural number of struts.

6. A miniature liquid-fueled turbojet engine of claim 1, wherein the number of atomizers is six.

* * * * *